R. N. ALLEN.

CAR WHEEL.

No. 10,306. Reissued Apr. 10, 1883.

Witnesses:
Henry Gibling
R. F. Gaylord

Inventor
Richard N. Allen
by Robert H. Duncan
atty.

N. PETERS, Photo-Lithographer, Washington, D. C.

UNITED STATES PATENT OFFICE.

RICHARD N. ALLEN, OF CLEVELAND, OHIO.

CAR-WHEEL.

SPECIFICATION forming part of Reissued Letters Patent No. 10,306, dated April 10, 1883.

Original No. 268,378, dated December 5, 1882. Application for reissue filed January 26, 1883.

*To all whom it may concern:*

Be it known that I, RICHARD N. ALLEN, of the city of Cleveland, in the county of Cuyahoga and State of Ohio, have invented a new and useful Improvement in Car-Wheels, of which the following is a specification.

The present invention relates to that class of car-wheels in which the tire constitutes a separate part or piece of the wheel from the central portion thereof; and the special objects of the invention are to provide a strong and durable wheel which can be cheaply manufactured by reason of the minimum weight of metal required and the fewness and simplicity of its parts, and which will also permit, by reason of the manner of securing the tire to the body of the wheel, of the ready substitution of a new tire when the old one is worn out or broken.

Figure 2:
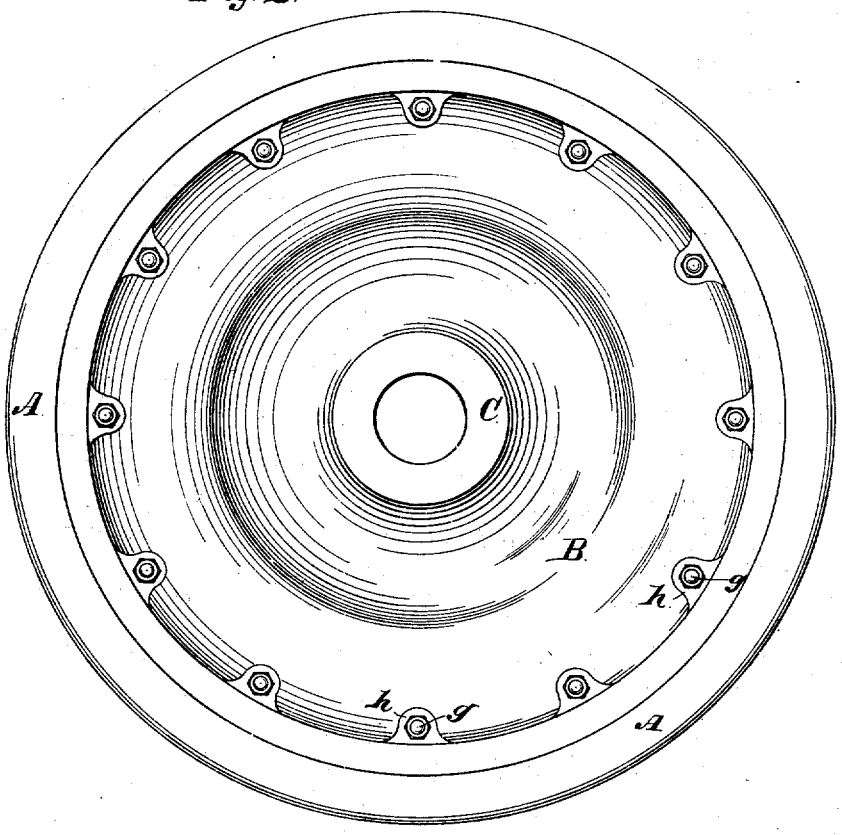
Figure 1:
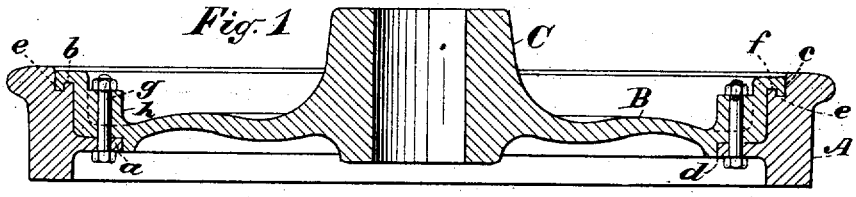

The invention is illustrated in the accompanying drawings, in which Figure 1 is a central cross-section of my improved wheel, and Fig. 2 is a view in elevation of the inner or rear side or face of the same.

In the drawings, A represents the tire of the wheel, which is provided with an annular web or flange, *a*, projecting inwardly or toward the hub, and is also provided upon its inner edge with an annular tongue, *b*, and an annular groove, *c*. The tire is of wrought steel or iron, and is preferably made without weld or joint by the operation of rolling or forging.

B represents the central plate, and C the hub of the wheel. These two parts may be made to constitute a single piece or casting; or the central plate and the hub may be formed separately and be secured together in the wheel in any desirable way, as by means of bolts passed through a flange projecting from the hub and through an overlapping part of the plate B. The plate B, at its periphery and upon its outer face, is provided with a recess, *d*, into which the flange *a* of the tire is fitted, and it is also provided with an annular tongue, *e*, corresponding with and entered into the groove *c* on the edge of the tire, and a groove, *f*, corresponding with the tongue *b* on the tire, and constituting, when the parts are brought into position, a tongue-and-groove lock or fastening. The tire and the plate B are firmly secured together by means of a series of bolts, *g*, passed through the web *a* and the plate B, near its periphery; and to compensate for the weakening of the plate at this part by the bolt-holes, as well as to give it additional strength to resist the blows communicated through the tire, a series of bosses, *h*, equal in number to the bolts *g*, are formed upon the inner face of the plate B, through which the bolts pass. Instead of forming such series of bosses, the metal of the plate may be thickened near the tire to form a projection extending around the plate near its periphery. This would answer the same purpose of giving the necessary bearing for the bolts and strengthen this part of the wheel to sustain the shocks from the tire.

I prefer to form the central plate, B, and the hub C in a single piece by casting them from steel of good quality. This will give to these parts the requisite strength, and at the same time leave them much lighter than if they were made of equal strength from cast-iron. They may, however, be made practically and efficiently in a single piece from wrought-iron by forging. I also prefer to corrugate the central plate between the hub and the tire, substantially as shown in the drawings, although I do not limit the invention in any respect by reason of this form, inasmuch as a plain central plate would be practical.

In constructing or repairing the wheel the tire A may be forced into place upon the periphery of the plate B by means of hydraulic or other requisite pressure, the tongues and grooves of each being shaped to make close joints; or the tongue and groove of the tire may be made slightly smaller than the corresponding parts of the plate, and then, by heating the tire, bringing the tire and plate into their final position, and cooling, they can be firmly shrunk together.

It will be readily observed that all that is required to substitute a new tire for a worn one is to remove the bolts *g*, force the old tire off and force a new one into its place, and then replace the bolts.

The above-described wheel is simple in its construction, requiring, when the hub and central plate are cast or formed together, only these two pieces, the tire and the body of the wheel, besides the bolts. By making the hub and plate B of steel or wrought-iron the requisite strength with the minimum weight of metal is obtained. The mode of securing the central plate to the tire is simple and reliable, and affords means for the easy and quick removal and replacement of the tire.

It will be manifest that the recess *d* upon the outer face of the central plate does not facilitate the removal or renewal of the tire, the function of such recess being to increase the bearing-surface of the tire on the central plate.

What is claimed as new is—

1. A car-wheel composed of a hub, a central plate, and a tire, the latter being provided with an annular inwardly-projecting web or flange fitted into a recess in one side of the central plate, and the tire and the central plate being secured together by a tongue-and-groove lock and by bolts passed through the said plate and the web of the tire.

2. A car-wheel composed of a hub, a single central plate, and a tire, the latter being provided with an inwardly-projecting web or flange, and the tire and the central plate being secured together by a tongue-and-groove lock and by bolts passed through the said plate and the web of the tire.

RICHARD N. ALLEN.

Witnesses:

FREDERICK S. SMITH,
ROBERT F. PAINE.